UNITED STATES PATENT OFFICE.

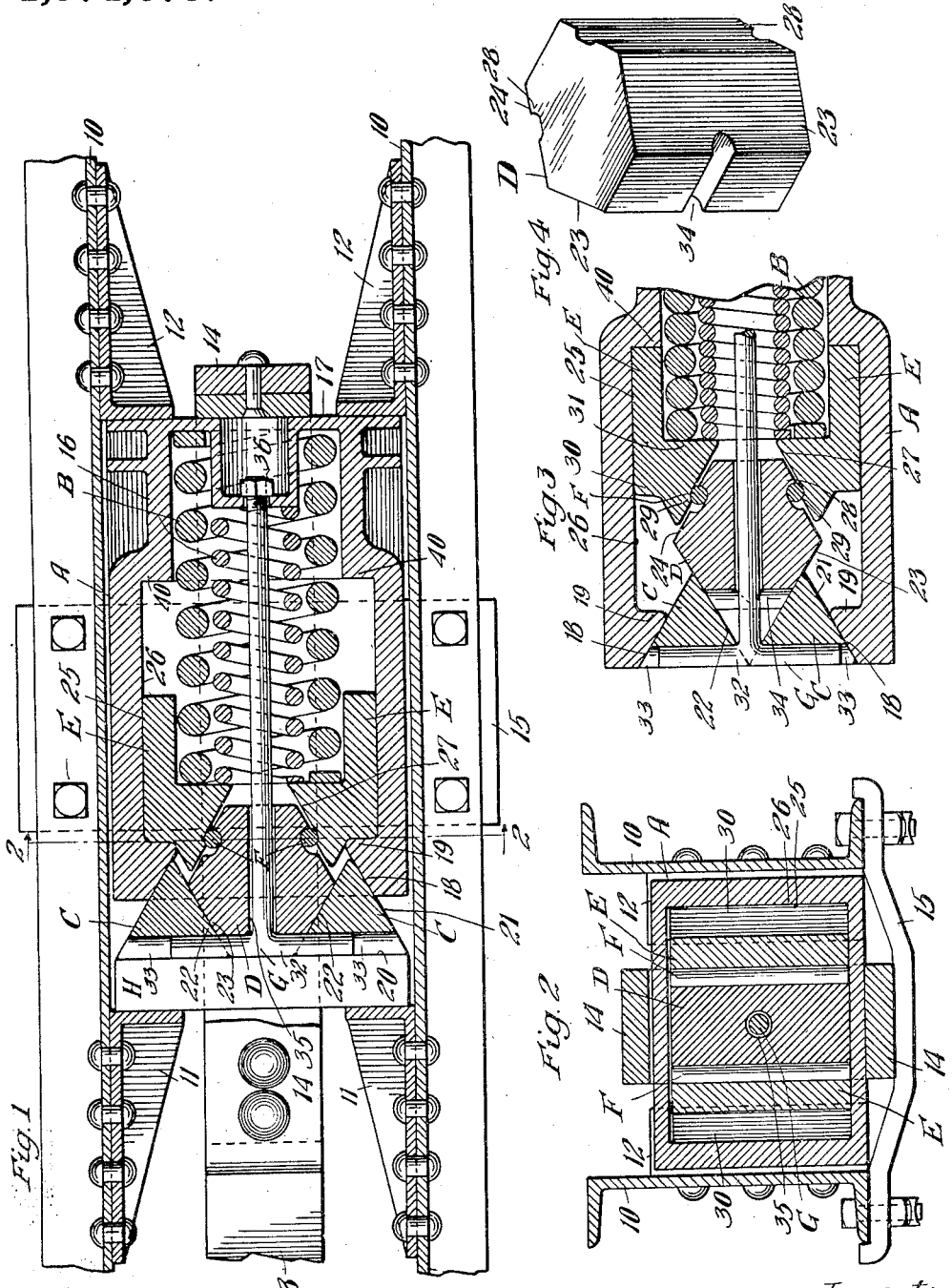

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,374,675.     Specification of Letters Patent.     Patented Apr. 12, 1921.

Application filed November 28, 1919. Serial No. 341,011.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a high capacity friction shock absorbing mechanism wherein is also obtained certain release and differential action of the friction elements.

In the drawing forming a part of this specification, Figure 1 is a horizontal longitudinal sectional view of a portion of a railway draft rigging showing my improvements in connection therewith, the shock absorbing mechanism in this instance being a draft gear. Fig. 2 is a vertical transverse sectional view taken substantially on the line 2—2 of Fig. 1. Fig. 3 is a broken sectional view similar to Fig. 1 illustrating the shock absorbing mechanism proper and the position assumed by the parts at the end of the compressive stroke. Fig. 4 is a detail perspective of the central wedge block employed in the mechanism.

In said drawing, 10—10 denote channel-shaped center or draft sills of a car to the inner faces of which are secured front stops 11—11 and rear stops 12—12 spaced the usual distance apart. A portion of a drawbar is indicated at 13, the same being operatively connected to the shock absorbing mechanism proper by a yoke 14 of well known form. The parts of the mechanism are supported by a detachable saddle plate 15. The improved shock absorbing mechanism proper, as shown, comprises, broadly, a combined friction shell and spring cage casting A, a main spring resistance B, an outer pair of wedges C—C, a central wedge block D, a pair of inner friction shoes E—E, anti-friction rollers F, and a retaining bolt G. A front follower H is also employed which is interposed between the butt of the drawbar and the outer elements of the shock absorbing mechanism proper. As shown, the casting A has a friction shell proper at its front or outer end, hereinafter described, and a spring cage 16 at its rear end. An integral rear wall 17 is provided suitably extended at each side so as to adapt it for use as the rear follower of the mechanism. The friction shell proper is of generally rectangular hollow box form, as shown in Fig. 2, and has opposed rearwardly converging side friction surfaces 18—18 and rearwardly thereof is formed with transverse shoulders 19—19.

The wedges C—C are each of substantially equilateral triangular cross section horizontally so that each has a front friction surface 20, an outer or side friction surface 21 and an inner friction surface 22. The front friction surfaces 20 coöperate with the inner face of the follower when the wedges C are forced rearwardly and laterally toward each other. The outer or side friction surfaces 21 coöperate with the friction surfaces 18 of the shell, as clearly indicated in Fig. 1. The central wedge block D is of substantially hexagonal cross section and is provided with a pair of outer rearwardly diverging friction surfaces 23—23 and an inner pair of rearwardly converging wedge faces 24—24. As will be evident, the friction surfaces 23 coöperate with the friction surfaces 22 of the shoes.

The friction shoes E—E are each provided with an outer longitudinally extending friction surface 25 coöperable with a corresponding friction surface 26 on the interior of the shell. At its outer end, each shoe E is provided with a wedge face 27 opposed to the corresponding wedge face 24 of the block D. The anti-friction rollers F are interposed between the wedge faces 24 and 27 as indicated in the drawing and suitable shoulders 28 and 29 are formed on the block and shoes to maintain the rollers in proper place. Each shoe E is furthermore provided with a shoulder 30 adapted to coöperate with the corresponding shoulder 19 in order to limit the outward movement of the shoes with respect to the shell. The spring B which consists of two coils as shown, bears at its rear end against the casting A and at its forward end against inner shoulders 31—31 formed on the shoes E.

The retaining bolt G has an outer T-end as indicated at 32, the arms of the T seating in laterally extending recesses 33—33 formed in the wedges C and a recess 34 formed in the outer end of the block D. The block D is centrally perforated as indicated at 35 to accommodate the shank of the bolt G, the nut 36 of the bolt being disposed within a suitable pocket formed in the rear of the casting A. As will be apparent, the bolt G holds the parts in assembled relation and the same may be employed to maintain the spring G under an initial compression so as to take up any wear on the parts occurring in service.

The operation is as follows. Assuming an initial movement of the drawbar the follower H will force the wedges C rearwardly and as they move rearwardly down the inclined friction surfaces 18, they will be forced inwardly laterally toward each other.

The combined longitudinal and lateral movement of the wedges C will in turn force the block D rearwardly at a faster rate. The rearward movement of the block D serves to spread or wedge the shoes E outwardly thereby increasing the friction between the shoes E and the shell, the shoes being forced rearwardly against the action of the spring B until the shoes come into contact with the inner limiting stop shoulders 40 on the casting A. By employing the anti-friction rollers between the block D and shoes E, danger of sticking or jamming is thereby overcome and certain release insured. It is evident that danger of sticking between the wedges C and shell is negligible because of the flaring nature of the mouth of the shell. From the preceding description, it will be noted that friction is generated between the wedges C and follower H; between the wedges C and shell; between the wedges and block D; and between the shoes E and friction shell. Furthermore, it will be noted that the shoes have a much longer travel than the movement of the drawbar which increases the amount of work performed by the shock absorbing mechanism.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a friction shell having inwardly converging friction surfaces at its outer end and provided also with friction surfaces on the interior of the shell located inwardly of said converging friction surfaces; of a pair of wedges coöperable with said converging friction surfaces of the shell; a wedge block interposed between said wedges and coöperable therewith; means including friction shoes affording a yielding resistance to the movements of said block and wedges with respect to the shell; and a retaining element connected at one end to the inner end of said shell and having means at its other end for directly engaging and limiting the outward movements of both of said wedges with respect to the shell.

2. In a friction shock absorbing mechanism, the combination with a follower; of a pair of wedges frictionally coöperable with said follower; a friction shell having inwardly converging friction surfaces at its outer end and additional, separate friction surfaces on the interior of the shell inwardly of said converging friction surfaces, said wedges being coöperable with said converging surfaces; friction shoes within the shell slidably mounted on said longitudinally extending friction surfaces; spring means interposed between said shoes and shell; a one piece wedge block interposed between said wedges and shoes and having wedge faces opposed to the shoes; and means including an element extending through the center of said wedge block, arranged to limit the outward movement of the wedges and wedge block with respect to the shell.

3. In a friction shock absorbing mechanism, the combination with a casting closed at one end and open at its other end, said casting having inwardly converging friction surfaces at said open end and longitudinally extending friction surfaces inwardly thereof; of a spring resistance mounted within said casting; friction shoes within said casting having friction surfaces coöperable with said longitudinally extending surfaces and provided also with inner wedge faces; of a follower disposed adjacent the open end of said casting; a pair of triangular wedges interposed between said follower and said casting and frictionally coöperable with the follower and said converging surfaces; a central wedge block having an outer pair of diverging friction surfaces coöperable with said wedges and an inner converging pair of wedge faces; antifriction rollers interposed between the wedge faces of the block and shoes; and means for holding the wedges, block, shoes, rollers, spring and casting in assembled condition.

4. In a friction shock absorbing mechanism, the combination with a friction shell having interior friction surfaces at its outer end; of a pair of laterally spaced friction elements coöperable with said friction surfaces; an intermediate friction element coöperable with said first named friction elements, means for yieldingly resisting movement of all of said friction elements inwardly of the shell; and a retaining element connected at one of its ends to the inner end of the shell and having means at its other end for directly engaging all of said friction elements and limiting the outward movements thereof with respect to the friction shell.

In witness that I claim the foregoing I have hereunto subscribed my name this 20th day of Nov., 1919.

JOHN F. O'CONNOR